(12) United States Patent
Schnarr et al.

(10) Patent No.: US 11,123,587 B2
(45) Date of Patent: Sep. 21, 2021

(54) ON-BOARD MIXING SYSTEM FOR FIREFIGHTING CHEMICALS

(71) Applicant: Barracuda Environmental Solutions Inc., Drayton Valley (CA)

(72) Inventors: Michael Schnarr, Sonora, CA (US); Dennis Hulbert, Grass Valley, CA (US); Marshall Graves, Carmichael, CA (US); Danny Milligan, Chiloquin, OR (US); Gerald Geissler, Chinese Camp, CA (US); Duane Floden, Drayton Valley (CA)

(73) Assignee: Barracuda Environmental Services Inc., Drayton Valley (CA)

( * ) Notice: Subject to any disclaimer, the term of this patent is extended or adjusted under 35 U.S.C. 154(b) by 238 days.

(21) Appl. No.: 16/186,438

(22) Filed: Nov. 9, 2018

(65) Prior Publication Data

US 2019/0299040 A1    Oct. 3, 2019

Related U.S. Application Data

(60) Provisional application No. 62/651,112, filed on Mar. 31, 2018.

(51) Int. Cl.
*A62C 5/00* (2006.01)
*B01F 3/10* (2006.01)
(Continued)

(52) U.S. Cl.
CPC .......... *A62C 5/002* (2013.01); *A62C 3/0228* (2013.01); *A62C 5/033* (2013.01); *B01F 3/0807* (2013.01);
(Continued)

(58) Field of Classification Search
CPC ....... A62C 5/002; A62C 5/033; A62C 3/0228; B01F 3/10; B01F 3/088; B01F 15/0416;
(Continued)

(56) References Cited

U.S. PATENT DOCUMENTS 2,249,095 A * 7/1941 Swift ............... A62C 5/002
261/83
2,611,439 A * 9/1952 Faulkner ......... A62C 5/002
169/15
(Continued)

FOREIGN PATENT DOCUMENTS

| CA | 2818419 A1 | 5/2014 | |
| CA | 2887714 C | 8/2015 | |
| GB | 529225 A * | 11/1940 | ............. A62C 5/002 |

*Primary Examiner* — Charles Cooley
(74) *Attorney, Agent, or Firm* — Donald V. Tomkins (57) ABSTRACT

A system for mixing fire-suppressant gel with water on board an aircraft includes a gel reservoir mounted in the aircraft, a pump for injecting gel into a flow of water into an aircraft-mounted payload tank, and a control system for controlling gel-water mix ratios. The control system monitors water volume flowing into the water tank, and regulates the gel pump to inject gel in appropriate amounts to produce gel-water emulsions having precise gel-water ratios. Settings for the control system are set by the pilot before water flow water is initiated. Once the aircraft is in flight, the gel-water mixing process is automatically controlled through a trigger on the pilot's control stick. The aircraft may be a helicopter or fixed-wing aircraft adapted to load water from a lake or other source while in flight, or a fixed-wing aircraft adapted to load water on land from a pressurized water source.

16 Claims, 5 Drawing Sheets

(51) Int. Cl.
*B01F 3/08* (2006.01)
*B01F 15/04* (2006.01)
*A62C 5/033* (2006.01)
*B64D 1/16* (2006.01)
*A62C 3/02* (2006.01)
*B01F 13/00* (2006.01)

(52) U.S. Cl.
CPC ............. *B01F 3/088* (2013.01); *B01F 3/10* (2013.01); *B01F 13/0016* (2013.01); *B01F 15/0416* (2013.01); *B64D 1/16* (2013.01); *B01F 2003/105* (2013.01)

(58) Field of Classification Search
CPC ............. B01F 3/0807; B01F 2003/105; B01F 5/0471; B01F 13/0016; B64D 1/16; G05D 11/132
USPC ...................................................... 366/152.6
See application file for complete search history.

(56) References Cited

U.S. PATENT DOCUMENTS

| | | | | |
|---|---|---|---|---|
| 2,696,266 A * | 12/1954 | Tuve | ............ | A62C 5/002 169/14 |
| 2,988,151 A * | 6/1961 | Dion-Biro | ............ | A62C 5/002 169/14 |
| 3,811,660 A * | 5/1974 | Cole, Jr. | ............ | E21F 5/06 261/18.1 |
| 3,846,515 A * | 11/1974 | Williamson | ............ | A62C 5/002 261/18.3 |
| 4,234,007 A * | 11/1980 | Titone | ............ | G05D 11/132 137/101.19 |
| 4,324,294 A * | 4/1982 | McLoughlin | ............ | A62C 5/00 137/101.21 |
| 4,474,680 A * | 10/1984 | Kroll | ............ | B01F 3/04446 169/15 |
| 5,102,228 A * | 4/1992 | Vine-Lott | ............ | B01F 3/04992 137/599.04 |
| 5,141,363 A * | 8/1992 | Stephens | ............ | E21D 11/105 405/150.1 |
| 5,145,014 A * | 9/1992 | Eberhardt | ............ | A62C 5/02 169/13 |
| 5,174,383 A * | 12/1992 | Haugen | ............ | A62C 5/02 169/13 |
| 5,232,052 A * | 8/1993 | Arvidson | ............ | A62C 5/02 169/14 |
| 5,419,632 A * | 5/1995 | Stephens | ............ | B28C 5/386 366/3 |
| 5,494,112 A * | 2/1996 | Arvidson | ............ | A62C 5/02 137/101.21 |
| 5,764,463 A * | 6/1998 | Arvidson | ............ | A62C 5/02 361/23 |
| 5,795,060 A * | 8/1998 | Stephens | ............ | B01F 3/12 366/10 |
| 5,803,596 A * | 9/1998 | Stephens | ............ | A62C 5/02 169/15 |
| 5,951,161 A * | 9/1999 | Blagg | ............ | B01F 15/042 366/152.6 |
| 6,085,586 A * | 7/2000 | Arvidson | ............ | A62C 5/02 169/16 |
| 6,513,964 B1 * | 2/2003 | Himmelright | ............ | B01F 3/0857 366/141 |
| 6,725,940 B1 * | 4/2004 | Klein | ............ | A62C 5/02 169/14 |
| 7,318,483 B2 * | 1/2008 | Arvidson | ............ | A62C 5/02 137/3 |
| 7,766,537 B2 * | 8/2010 | Gembala | ............ | B28C 7/02 366/10 |
| 8,408,781 B2 * | 4/2013 | Welker | ............ | B01F 15/00136 366/3 |
| 8,839,876 B2 * | 9/2014 | McLoughlin | ............ | A62C 99/009 169/13 |
| 9,744,388 B2 * | 8/2017 | Ewers | ............ | A62C 31/12 |
| 10,406,390 B2 * | 9/2019 | Zimmerman | ............ | B64D 1/18 |
| 11,046,433 B2 * | 6/2021 | Trotter | ............ | E05F 15/63 |
| 2004/0055762 A1* | 3/2004 | Arvidson | ............ | A62C 5/02 169/14 |
| 2004/0177975 A1* | 9/2004 | Laskaris | ............ | A62C 5/02 169/13 |
| 2014/0262355 A1* | 9/2014 | Linsmeier | ............ | A62C 37/50 169/24 |
| 2018/0126203 A1* | 5/2018 | Beluse | ............ | A62C 27/00 |
| 2019/0299040 A1* | 10/2019 | Schnarr | ............ | B01F 15/0416 |
| 2020/0353299 A1* | 11/2020 | Lund | ............ | F04D 13/12 |

* cited by examiner

ON-BOARD MIXING SYSTEM FOR FIREFIGHTING CHEMICALS

FIELD

The present disclosure relates in general to systems and methods for applying firefighting chemicals to wildfires such as forest fires and brush fires, using both rotary-wing aircraft (i.e., helicopters) and fixed-wing aircraft, and relates in particular to systems and methods for mixing liquid polymer gels with water in helicopters and water-scooping aircraft while airborne, as well as on-board non-scooping aircraft while on the ground, to produce gel-water emulsions for application to wildfires.

BACKGROUND

It is increasing common for aerial firefighting operations to use liquid polymer water-enhancing gels, in a gel-water emulsion, for application to wildfires. Such gels are proven to be more effective in combating wildfires than other chemicals or straight water. In conventional methods, the gels are mixed with water on the ground, and the resultant gel-water emulsion is then stored in storage tanks. Firefighting aircraft load the gel-water emulsion from the storage tanks or from ground-based mixing plants, and then fly to the wildfire site, drop their payload (i.e., emulsion) on the fire, and return to their ground base to load up with more emulsion. This procedure entails one round trip between the ground base and the fire site for each load of emulsion dropped on the fire.

In cases where a rotary-wing aircraft (i.e., helicopter) is used for aerial firefighting, it is typically equipped with a snorkel apparatus that can be extended below the helicopter, while in hovering flight, to draw water from a lake or other water source and load it into the helicopter's on-board water storage tank. This snorkel can also be used to load gel-water emulsion from a ground storage tank into the helicopter's on-board water tank while the helicopter is in hovering flight. In fact, using the snorkel is commonly the only practical way for a helicopter to maximize its emulsion payload, because a helicopter in hovering flight typically will be able to carry a greater payload than it could lift off with if loaded while on the ground.

In cases where a fixed-wing aircraft is used for aerial firefighting, the aircraft can either be equipped with a scooping apparatus that can be lowered below the aircraft's floats (or hull) to draw water from a lake or other water source and load it into the aircraft's on-board water tank or can land and be refilled using a pressurized water system.

For reasons of efficiency as well as economy, it is desirable to maximize the payload carried by firefighting aircraft on each trip to the fire site. However, achieving this objective when using rotary-wing aircraft by loading emulsion while in hovering flight at a ground base introduces an additional potential safety hazard to aircrew and ground crew alike, given that the helicopter is hovering close to the ground while loading from a storage tank, and that the aircrew's workload is intensified during such operations. Returning to a ground base to reload with emulsion is inefficient, and greatly increases turnaround time back to the fire compared to using a local water source and on-board blending.

The benefit of using scooping fixed-wing firefighting aircraft is their ability to utilize a water source near the fire is that after dropping their initial payload on the fire, they can reload with water from the local source and return to the fire, rather than needing to return to a ground base to reload. However, only the initial payload can be an emulsion payload, and any additional trips back to the fire before returning to base will be limited to dropping water on the fire, and thus will have reduced firefighting efficiency as compare to using emulsion.

Non-scooping fixed-wing firefighting aircraft are limited to bases with pre-existing infrastructure, or may be unable to utilize gel-water emulsion on initial attack at the fire scene, when drops have the best chance of being effective.

The problems discussed above can be addressed by mixing the gel with water in the aircraft, either while airborne for rotary-wing and scooping aircraft, or while on land for non-scooping fixed-wing aircraft. Examples of known systems and methods for doing this are disclosed in Canadian Patent Application No. 2,818,419 (Solomon) and Canadian Patent No. 2,887,714 (Doten). In such prior art systems, a helicopter is fitted with a gel storage reservoir, so that while the helicopter is in flight, gel drawn from the helicopter's on-board gel reservoir can be mixed with water drawn up through the helicopter's snorkel, with the mixture then being stored in the helicopter's on-board water tank (alternatively referred to as a payload tank) for application to a wildfire. The ability to mix and prepare the gel-water emulsion while the helicopter (or other type of aircraft is in flight makes it possible for an aircraft to apply two or more payloads onto a wildfire before needing to return to base for refueling.

However, the mixing process must ensure that the gel is effectively dispersed into the water, and in precise concentrations, for optimal firefighting effectiveness and in some cases to meet industry and/or regulatory standards. Known on-board mixing systems have different challenges. Some do not properly "shear" the gel (which is necessary to achieve satisfactory dispersal of the gel in a gel-water emulsion), and rely on mixing or circulating the product inside the water tank (which does not work effectively).

Some on-board gel mixing systems are designed with bulky and heavy pistons that require large amounts of space and power. Some use venturi effect to inject the gel into the water stream, but this is has not proven effective to provide reliably sufficient gel dispersal or reliably precise gel concentrations in the emulsion. Some gels have a usage range (i.e., an approved mix ratio that is not fixed, and can vary within specified range), and some gels have only a single fixed approved mix ratio and therefore must be mixed precisely.

Having regard to the foregoing considerations, there is a need for improved systems and methods for mixing a liquid gel and water on-board an aircraft, whether in flight or while on the ground, while ensuring effective gel dispersion in the resultant emulsion, ensuring precise control of gel concentration in the emulsion, and providing reliably accurate means for measurement of gel concentration in the emulsion.

BRIEF SUMMARY

The present disclosure teaches systems and methods that allow firefighting aircraft, including tanked rotary-wing aircraft (helicopters), scooping fixed-wing aircraft, and non-scooping fixed-wing aircraft, to precisely mix liquid polymer gels (or other chemicals) on-board the aircraft, while taking on water either in flight or while on the ground. In the case of a snorkel-equipped helicopter, gel from an on-board gel reservoir is injected into a flow of water being drawn up from a lake or other water source through the snorkel. Similarly, in the case of a fixed-wing aircraft adapted for scooping water from a lake, gel from an on-board gel reservoir is injected into the flow of water from the scoops. In the case of a non-scooping, land-based fixed-wing aircraft, gel from an on-board gel reservoir is injected into the flow of water from a pressurized water source. In any of these cases, the force of the water flow during typical water-loading operations will be sufficient to shear the gel to achieve satisfactory gel dispersal within the resultant gel-water emulsion.

One exemplary and non-limiting embodiment of a system in accordance with the present disclosure includes:
- a gel reservoir (optionally designed as a step/tank) which is mounted onto the side of a snorkel-equipped helicopter (the step/tank configuration also aids fire crews in entering and exiting the aircraft);
- a gel pump for injecting gel from the gel reservoir into the water stream at or near the point where the snorkel discharges water into the helicopter's water tank (optionally, the gel pump may also be built into the gel reservoir); and
- a control system for setting and adjusting gel-to-water mix ratios.

The control system monitors the volume of water flowing to the water tank via the snorkel, and regulates the gel pump to provide precise amounts of gel for mixing. The control settings for the control system are set by the pilot before water is uploaded (which can be either on the ground before flight, or in flight), and are determined based on the particular type or brand of gel being used and the desired mix ratio. Once the aircraft is in flight, and the system has been armed, the gel mixing process is automatically controlled through a trigger on the pilot's control stick (which in the case of a helicopter is typically referred to as a "cyclic"). This system controls the gel pump speed to provide precise gel-water mixing ratios. There are no extra steps for the pilot versus using straight water.

A gel display panel incorporating or associated with a digital totalizer automatically displays the total volume (liters or gallons) of mixed (blended) product (i.e., gel-water emulsion) delivered, based on the selected mix ratio. The only pilot action required is to arm the system and select the mix ratio settings. Everything else is automatic, minimizing training requirements. The totalizer records delivered emulsion volumes for billing purposes, and displays this information on an associated display screen.

On-board gel mixing systems in accordance with the present disclosure properly "shear" the gel to achieve satisfactory gel dispersal in the gel-water emulsion product. These systems monitor and regulate the flows of both the gel concentrate and water to provide reliably precise gel concentrations in the gel-water emulsion product, and they do not rely on mixing or circulation of the product inside the aircraft's water tank for this purpose. In addition, these systems are compact and light in weight compared to prior art systems.

In accordance with the foregoing, the present disclosure teaches a system for mixing gel and water to produce a gel-water emulsion, wherein the system includes:

- a payload tank adapted to receive a flow of water from a water intake;
- a gel reservoir;
- a gel pump for conveying gel via a gel supply line from the gel reservoir to a selected injection point associated with the water intake;
- a gel processing unit (GPU);
- a gel flow sensor associated with the gel supply line, for collecting gel flow data at a selected point downstream of the gel pump, said gel flow sensor being in electronic communication with the GPU;
- a water flow sensor associated with the water intake, for collecting water flow data at a selected point upstream of the gel injection point, said water flow sensor being in electronic communication with the GPU;
- a gel control panel (GCP) in electronic communication with the GPU, said GCP having a gel control switch for selecting an operational mode setting;
- a gel select switch associated with the GCP, for setting a desired gel-water mix ratio and for conveying gel-water mix ratio settings to the GPU; and
- a pump control module (PCM) in electronic communication with the gel pump.

In response to data from the water flow sensor indicating the commencement of water flow, the GPU will send a pump speed command to the PCM, which in turn will activate the gel pump so as to initiate a flow of gel to the injection point at a rate that will produce a gel-water mixture flowing into the payload tank with a gel-water mix ratio corresponding to a gel-water mix ratio setting received from the gel control switch. Preferably, the GPU will be configured to receive a continuous transfer of gel flow data from the gel flow sensor and water flow data from the water flow sensor, and to automatically adjust the pump speed command as necessary to maintain the selected gel-water mix ratio in response to variations in the gel flow data and water flow data.

The gel select switch may be separate from or incorporated into the GCP. The PCM may be separate from or incorporated into the GPU.

The system may include a tank level probe for measuring the fluid level in the payload tank, with the tank level probe being in electronic communication with the GPU. The GPU may be configured to determine the quantity of gel-water mixture contained in the payload tank, based on data received from the tank level probe.

In preferred embodiments, the system may include a gel display panel in electronic communication with the GPU, for receiving, recording, and displaying data from the GPU.

The gel-water mixing system may be installed in an aircraft for purposes of firefighting. However, systems in accordance with the present disclosure may also be adapted for uses other than in association with aircraft, without departing from the scope of the present disclosure.

BRIEF DESCRIPTION OF THE DRAWINGS

Embodiments will now be described with reference to the accompanying Figures, in which numerical references denote like parts, and in which:

FIG. 1 is a schematic diagram of an exemplary control logic circuit for one embodiment of an on-board mixing system in accordance with the present disclosure.

FIG. 2 is a port-side view of a helicopter equipped with an on-board mixing system in accordance with the present disclosure.

FIG. 3 is a starboard-side view of the helicopter in FIG. 2.

FIG. 4 is a front view of the helicopter in FIG. 2.

FIG. 5 is a port-side view of a float-equipped fixed-wing aircraft equipped with an on-board mixing system in accordance with the present disclosure.

FIG. 6 is a front view of the fixed-wing aircraft in FIG. 5.

FIG. 7 is a port-side view of a ground loaded fixed-wing aircraft equipped with an on-board mixing system in accordance with the present disclosure.

DETAILED DESCRIPTION

Figure 1:
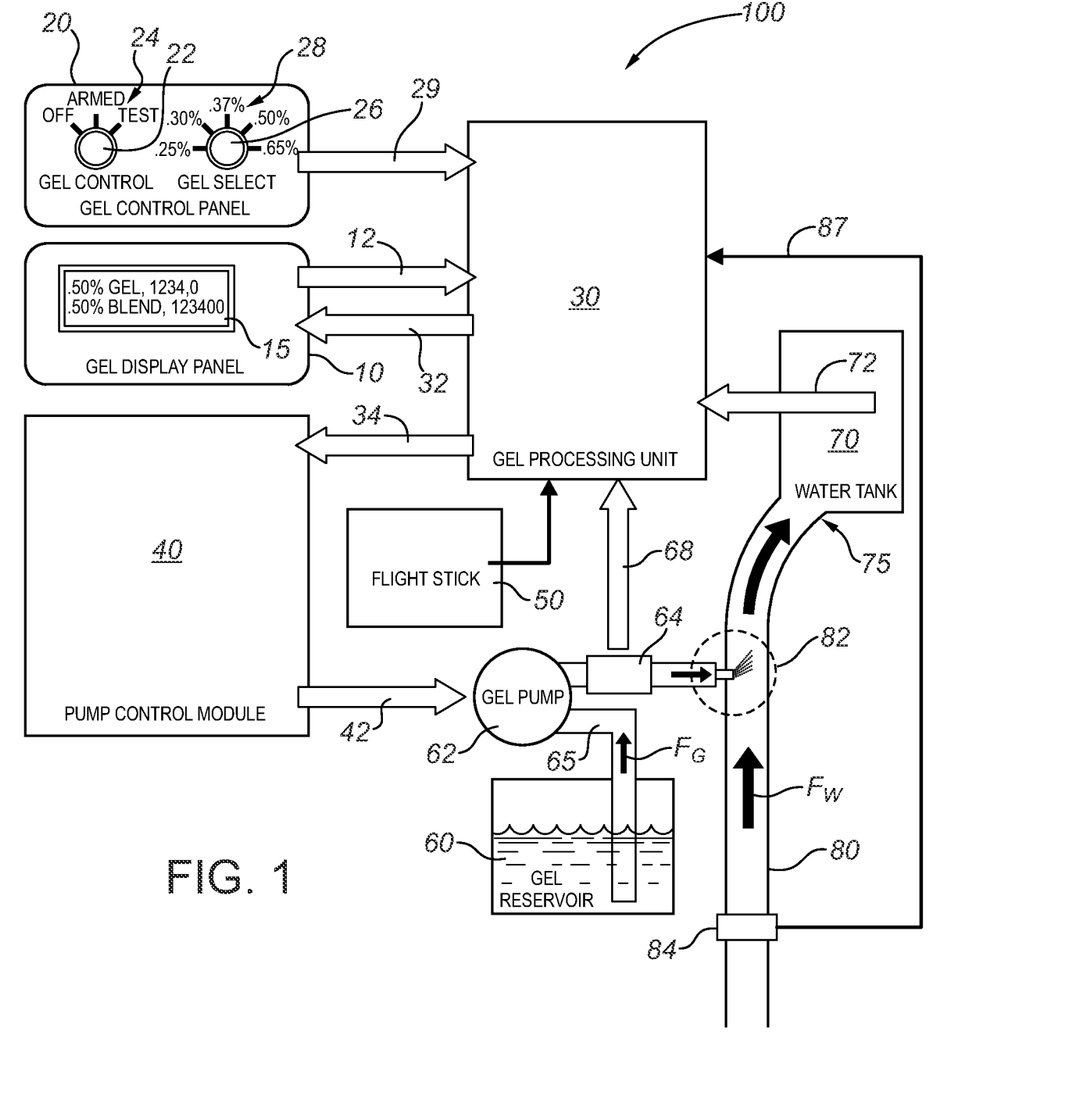

FIG. 1 schematically depicts an exemplary embodiment of a logic circuit of a control system 100 for an on-board gel mixing system in accordance with the present disclosure. Control system 100 includes a gel display panel 10, which serves as a totalizer, for receiving, recording, and displaying (on a screen 15) gel-water blend rates and volumes and other data from various system components. Control system 100 also includes a gel control panel (or GCP) 20, which has a gel control switch 22 for selecting an operational mode from a group of settings 24 including a TEST position, an ARMED position, and an OFF position.

Control system 100 further includes a gel select switch 26 (preferably but not necessarily incorporated in gel control panel 20) for selecting a desired gel-water mix ratio from a group of pre-set mix ratio settings 28. GCP 20 is in electronic communication (via a communication link 29) with a gel processing unit (or GPU) 30 associated with the particular aircraft in which the gel mixing system is installed. In preferred embodiments, GPU 30 will be in electronic communication with a flight control stick (or flight stick) 50 of the aircraft. (In the case of a helicopter, the flight control stick 50 is typically referred to as a "cyclic"; for a fixed-wing aircraft, flight stick 50 may be a conventional control column, stick, yoke, or other means for controlling pitch and roll, depending on the particular aircraft.)

In addition to being in electronic communication with flight control stick 50, GPU 30 is also in electronic communication with both gel display panel 10 (as schematically indicated by reference number 32 in FIG.1) and with GCP 20 (as schematically indicated by reference number 29), as well as with a pump control module (or PCM) 40 (as schematically indicated by reference number 34), which as schematically indicated by reference number 42 is in electronic communication with a gel pump 62 associated with a gel reservoir 60 mounted on or in the aircraft. Optionally, gel display panel 10 may be in electronic communication with GPU 30 (as schematically indicated by reference number 12), to request specific information for display on screen 15 or for other user-defined purposes.

Gel pump 62 is configured to deliver a flow of gel $F_G$, via a gel supply line 65 and an associated flow sensor 64, for injection (at an injection point 82) into a water intake 80 that delivers a flow of water $F_W$ into a water tank 70 mounted on or in the aircraft, via a fill port 75 (alternatively referred to as a water tank fill port or payload tank fill port) on water tank 70. Gel flow data from flow sensor 64 may be conveyed to GPU 30 via a communication link 68 as shown in FIG. 1. Water tank 70 has a water tank level probe 72 which is in electronic communication with GPU 30. A flow sensor 84 collects water flow data at a selected location in water intake 80 upstream of injection point 82, for conveyance to GPU 30 via a communication link 87 as shown in FIG. 1. PCM 40 preferably controls gel pump 62 using pulse width modulation (PWM). GPU 30 and PCM 40 may be provided as separate components, or may be combined or incorporated into one module.

Figure 2:
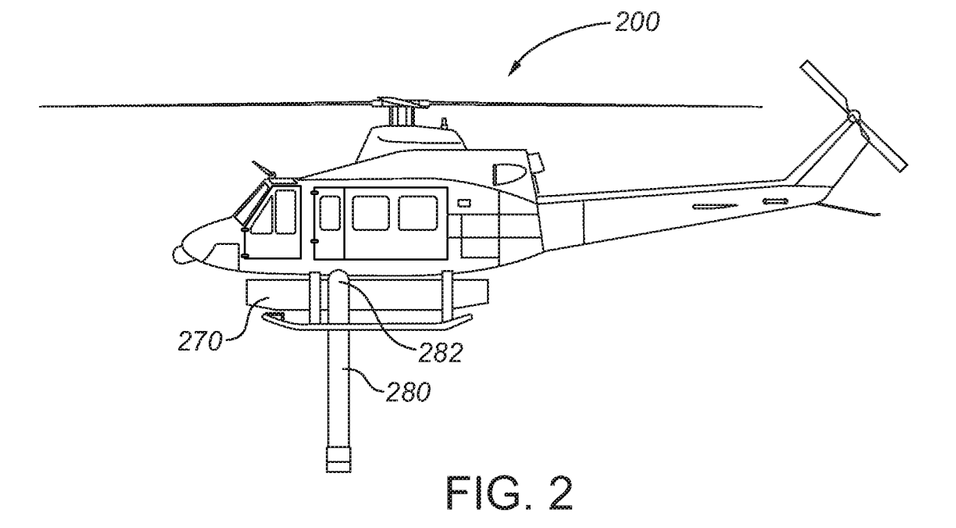
Figure 3:
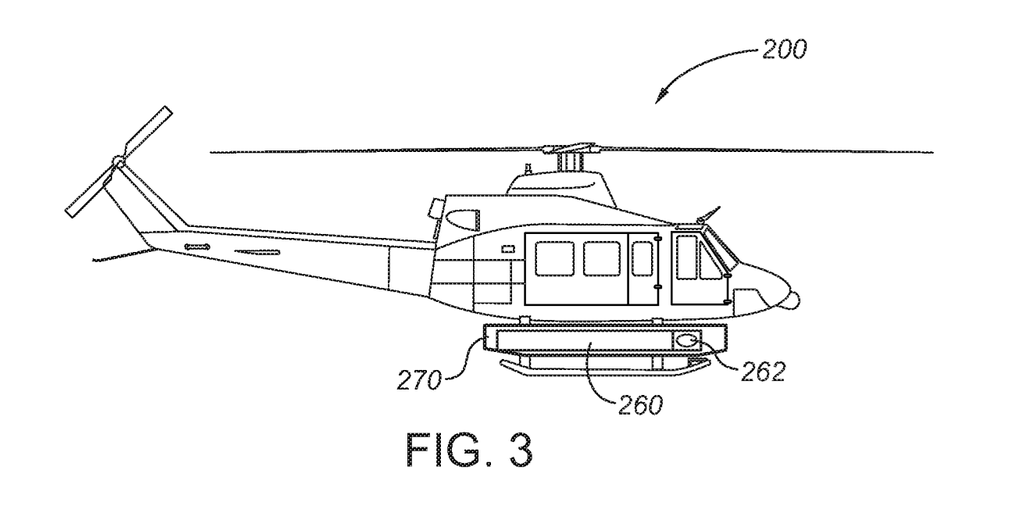
Figure 4:
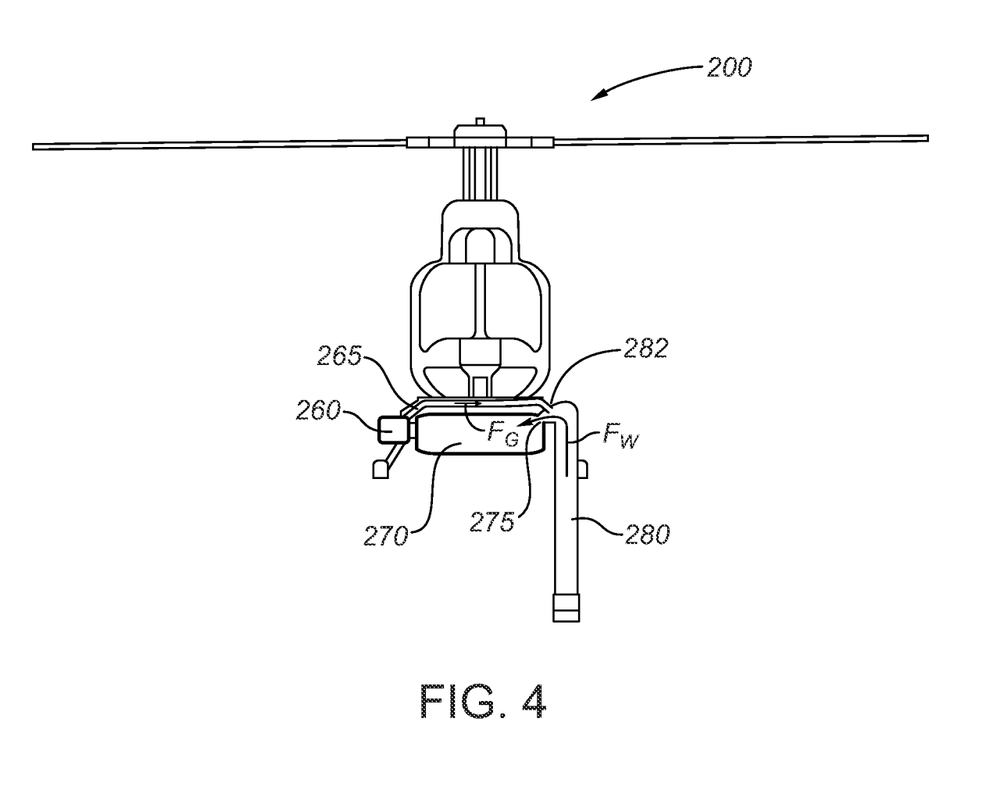

FIGS. 2-4 illustrate a helicopter 200 (shown by way of example as a Bell 214B) equipped with an embodiment of an on-board gel mixing system in accordance with the present disclosure. Helicopter 200 is fitted with an external water tank 270, a water intake in the form of a snorkel apparatus 280 for feeding water drawn from a water source into water tank 270. As shown in FIGS. 3 and 4, helicopter 200 is also fitted with an external gel reservoir 260 which is associated with a gel pump 262 for feeding gel to a gel injection point 282 proximal to a fill port 275 on water tank 270 where snorkel 280 feeds water into water tank 270. The gel is introduced into the flow of water at an injection point 282 by means of a gel injection nozzle of any suitable known type or other functionally suitable apparatus.

Figure 5:
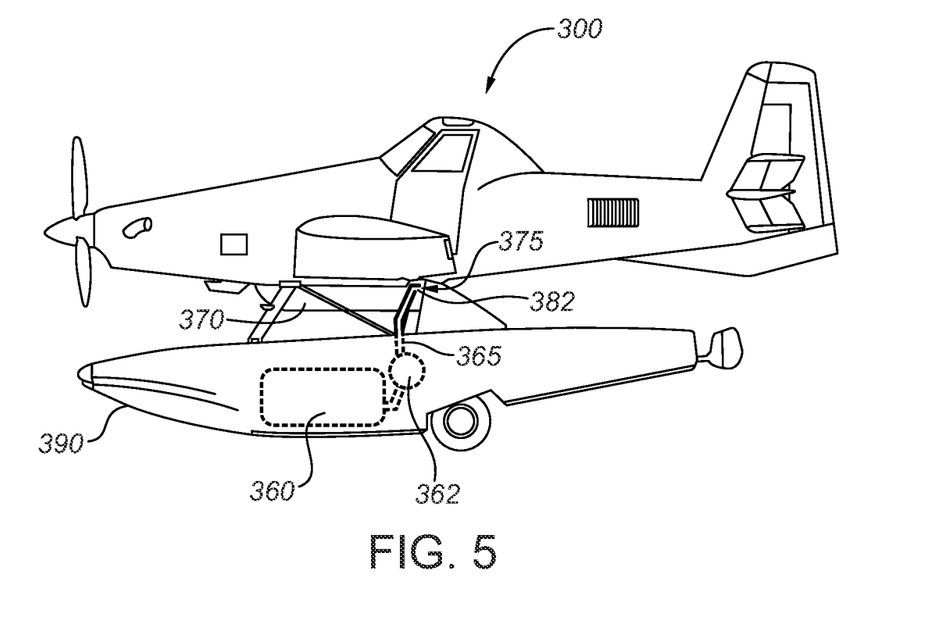
Figure 6:
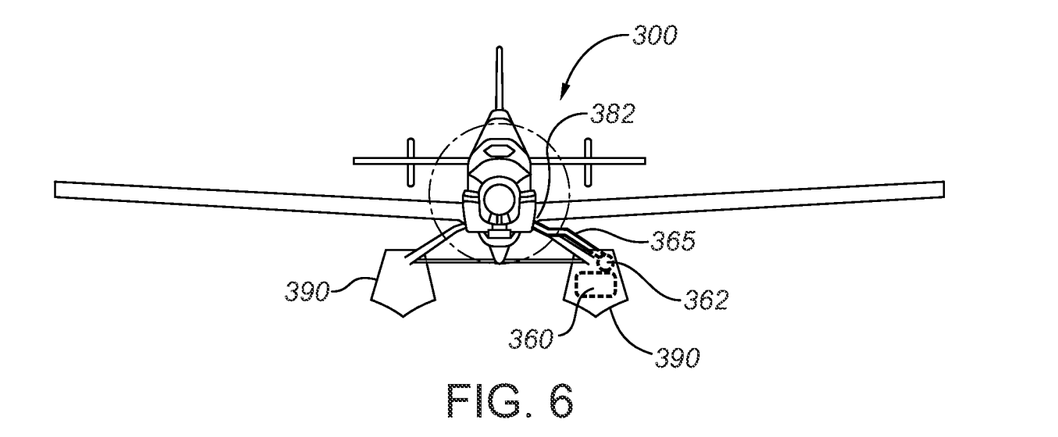

FIGS. 5 and 6 illustrate a fixed-wing "scooping" aircraft 300 (shown by way of example as a float-equipped Air Tractor AT-802F "Fire Boss") equipped with an embodiment of an on-board gel mixing system in accordance with the present disclosure. Aircraft 300 has floats 390 and a water tank 370 (which may be at least partially disposed within the fuselage of aircraft 300), plus a gel reservoir 360 disposed within one, or both, of floats 390. Floats 390 are fitted with scoops (not shown) that can be opened by the pilot to pick up water from a lake or river to fill water tank 370. A gel pump 362 associated with gel reservoir 360 delivers a flow of gel (as indicated by flow arrows $F_G$), via a gel supply line 365, to a gel injection point 382 proximal to a fill port 375 on water tank 370 where water picked up by the scoops feeds into water tank 370. The gel flow $F_G$ is introduced into the flow of water at injection point 382 by means of a gel injection nozzle or other functionally suitable apparatus.

Figure 7:
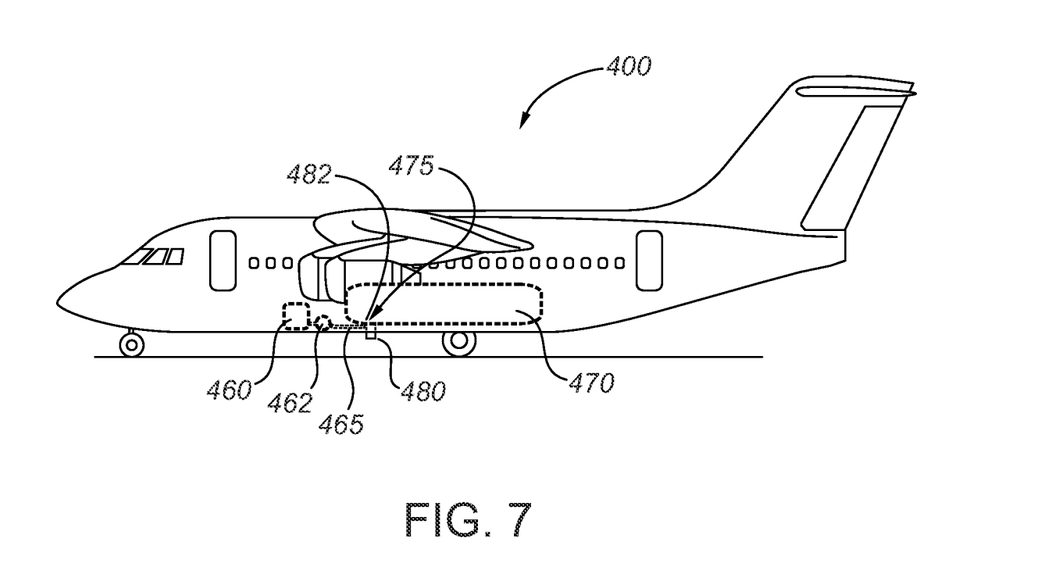

FIG. 7 illustrates a ground-loaded, non-scooping, fixed-wing aircraft 400 (shown by way of example as a British Aerospace BAE 146) equipped with an embodiment of an on-board gel mixing system in accordance with the present disclosure. As schematically illustrated in FIG. 7, aircraft 400 is fitted with an internal water tank 470 and a gel reservoir 460. Aircraft 400 is fitted with one or more water inlets 480 for connection to a pressurized water source at a ground base to fill water tank 470. A gel pump 462 associated with gel reservoir 460 feeds gel, via a gel supply line 465, to a gel injection point 482 proximal to a fill port 475 where water from water inlet 480 feeds into water tank 470. The gel is introduced into the flow of water at injection point 482 by means of a gel injection nozzle or other functionally suitable apparatus.

The three exemplary installations described above are discussed in more specific detail below.

Installation of Gel Mixing System in Helicopter

In cases where the gel mixing system is installed in a fixed-tank helicopter 200 as shown on FIGS. 2-4, gel control panel 20 controls whether gel concentrate pump 262 is:

operated in test mode (TEST);
 operated in an automatic mode (ARMED) in which pump 262 is slaved to a hover pump (not shown) associated with snorkel 280 and powered through a trigger on cyclic 50 of helicopter 200; or
 OFF.

In the TEST position, only gel concentrate pump 262 is powered. This feature is provided primarily for system checks and maintenance.

In an exemplary configuration for purposes of helicopter 200, gel select switch 26 of control system 100 can be used to select from a group of five gel-water mix ratios: 0.25%, 0.30%, 0.37%, 0.50%, and 0.65%, which are the U.S. Forest Service's approved mix ratios on the Qualified Products List (QPL) as of September 2017 for all liquid water enhancers authorized for use in fixed-tank helicopters. The control circuitry of control system 100 is configured to adjust the speed (i.e., RPM) of gel pump 262 to provide the desired mix ratio, preferably but not necessarily by means of RPM is controlled by means of pulse width modulation (PWM), or by current control, thru motor windings.

If helicopter 200 is already provided with a gel or foam reservoir (e.g., built into the helicopter's water tank 270, carried on board, or attached to the exterior of helicopter 200), it can be used as a gel reservoir. If no gel or foam reservoir exists, a gel reservoir 260 can be added to helicopter 200, in which case the added reservoir 260 will be sized having regard to the size of water tank 270 and fuel cycle capabilities.

By way of non-limiting example (and as illustrated in FIGS. 2-4), gel reservoir 260 may be mounted on the exterior of helicopter 200 in conjunction with an on-board gel mixing system in accordance with the present disclosure. Gel reservoir 260 will be sized to hold a gel volume sufficient for at least one fuel cycle (depending on the gel-water mix ratio selected, as well as other operational parameters). Gel resupply is then conducted during refueling.

Gel pump (or pumps) 262 may be located within or external to gel reservoir 260), and the flow of gel $F_G$ is routed via a gel supply line 265 to a gel injection point 282 at or proximal to fill port 275 where the flow of water $F_w$ from the water intake (i.e., snorkel 280) enters water tank 270, with water flow $F_w$ generating sufficient force to shear the gel in order to make the final product (i.e., gel-water emulsion).

Gel display panel/totalizer 10 of control system 100 provides a user interface with a screen 15 that displays the recorded amount of gel delivered, and the total volume (in liters or gallons) of payload (i.e., gel-water emulsion) delivered to water tank 270, based on the selected mix ratio. The totalizer's signal source (not the power source) for emulsion volume delivered is from the same indicator that provides a cockpit gage readout of payload volume (liters or gallons) and/or payload weight (converted to liters or gallons) and/or flow meters and/or water tank probes.

If the gel concentrate in gel reservoir 260 is depleted while gel injector pump 262 is operating, the flow sensor 64 and GPU 30 of control system 100 will detect the loss in pressure, and will interrupt electrical power to gel display panel/totalizer 10. Therefore, totalizer 10 can only operate when all three of the following conditions are met simultaneously, for greater assurance of a verifiable volume of gel-water payload deliverable to a fire agency:

The water suction pump associated with snorkel 280 (i.e., hover pump) is operating;
Gel pump 262 is operating; and
Gel pump 262 has positive output pressure.

Gel supply conduit 265 has a one-way check valve (not shown) located just prior to (i.e., upstream of) gel injection point 282; this check valve will close immediately with a loss in pressure in gel supply line 265, due to the gel injector pump power being cut off when the hover pump is shut off.

When the pilot of helicopter 200 activates the intake of water via snorkel 280 (e.g., by means of a trigger on cyclic 50), the gel processing unit (GPU) 30 activates the system. GPU 30 sends gel delivery and gel blend quantity data to gel display panel 10 (via a communication link 32 as shown in FIG. 1), and sends a speed command to the pump control module (PCM) 40 (via a communication link 34 as shown in FIG. 1) based upon the gel-water blend percentage. PCM 40 controls the speed of gel pump 262 (via a communication link 42 as shown in FIG. 1) as required to blend the gel at the percentage specified on gel control panel 20. In-line flow meters (not shown) send information back to GPU 30, constantly updating gel dosing information to ensure gel-water mix ratios precisely matching the specified percentages. Gel mixing (blending) occurs prior to the water entering the payload tank. The mixed product (gel-water emulsion) is stable and homogeneous, and no recirculation of the mixed product is necessary in order to keep the product in its emulsified state.

Installation of Gel Mixing System in Scooping Fixed-Wing Aircraft

Where the aircraft is a scooping fixed-wing air tanker 300 as shown in FIGS. 5 and 6, gel control panel 20 of control system 100 controls whether gel concentrate pump 362 is operated in TEST mode, in an automatic mode (ARMED) slaved to a combination of scoop deployment and flow sensors, or OFF. In the TEST position, only gel concentrate pump 362 is powered. This feature is provided primarily for system checks and maintenance.

In an exemplary configuration for purposes of aircraft 300, gel select switch 26 of control system 100 can select from a group of six gel-water mix ratios: 0.25%, 0.30%, 0.37%, 0.50%, 0.65% and 1.00%, which are the U.S. Forest Service's approved mix ratios on the Qualified Products List (QPL) as of September 2017 for all liquid water enhancers authorized for use in SEATs (single-engine air tankers) and multi-engine air tankers. The control circuitry of control system 100 is configured to adjust the speed (i.e., RPM) of gel pump 362 to provide the desired mix ratio, preferably but not necessarily by means of RPM is controlled by means of pulse width modulation (PWM), or by current control, thru motor windings.

If aircraft 300 is already provided with a gel or foam reservoir (e.g., built into water tank 370, carried on board, or inside one or both floats 390), it can be used as a gel reservoir. If no reservoir exists, a gel reservoir 360 can be added to aircraft 300, in which case the added reservoir will be sized having regard to the size of water tank 370 and fuel cycle capabilities. Gel reservoir 360 will be sized to hold a gel volume sufficient for at least one fuel cycle (depending on the gel-water mix ratio selected, as well as other operational parameters). Gel resupply is then conducted during refueling.

Gel pump (or pumps) 362 may be located within or external to gel reservoir 360, and the flow of gel $F_G$ is routed via a gel supply line 365 to a gel injection point 382 at or proximal to fill port 375 where the flow of water $F_w$ from the water intake (i.e., the scoops) enters water tank 370, with water flow $F_w$ generating sufficient force to shear the gel in order to make the final product (i.e., gel-water emulsion).

Gel display panel/totalizer 10 of control system 100 provides a user interface with a screen 15 that displays the recorded amount of gel delivered, and the total volume (in liters or gallons) of payload (i.e., gel-water emulsion) delivered to water tank 370, based on the selected mix ratio. The totalizer's signal source (not the power source) for emulsion volume delivered is from the same indicator that provides a cockpit gage readout of payload volume (liters or gallons) and/or payload weight (converted to liters or gallons) and/or flow meters and/or water tank probes.

If the gel concentrate in gel reservoir 360 is depleted while gel injector pump 362 is operating, the flow sensor 64 and GPU 30 of control system 100 will detect the loss in pressure, and will interrupt electrical power to gel display panel/totalizer 10. Therefore, totalizer 10 can only operate when all three of the following conditions are met simultaneously, for greater assurance of a verifiable volume of gel-water payload deliverable to a fire agency:

The scoops are lowered (powered) and water flow is detected;
Gel pump 362 is operating; and
Gel pump 362 has positive output pressure.

Gel supply conduit 365 has a one-way check valve (not shown) located just prior to (i.e., upstream of) gel injection point 382; this check valve will close immediately with a loss in pressure in gel supply line 365, due to the gel injector pump power being cut off when the water scoops are retracted or deactivated, or water flow is no longer detected.

When the pilot of aircraft 300 activates the intake of water via the scoops (e.g., by means of a trigger on control stick 50), the gel processing unit (GPU) 30 activates the system. GPU 30 sends gel delivery and gel blend quantity data to gel display panel 10 (via communication link 32 in FIG. 1), and sends a speed command to the pump control module (PCM) 40 (via communication link 34 in FIG. 1) based upon the gel-water blend percentage. PCM 40 controls the speed of gel pump 362 as required to blend the gel at the percentage specified on gel control panel 20. In-line flow meters (not shown) send information back to GPU 30, constantly updating gel dosing information to ensure gel-water mix ratios precisely matching the specified percentages. Gel mixing (blending) occurs prior to the water entering the payload tank. The mixed product (gel-water emulsion) is stable and homogeneous, and no recirculation of the mixed product is necessary in order to keep the product in its emulsified state.

Installation of Gel Mixing System in Non-Scooping Fixed-Wing Air Tanker

Where the aircraft is a non-scooping, land-based fixed-wing air tanker 400 as shown in FIG. 7, gel control panel 20 of control system 100 controls whether gel concentrate pump 462 is operated in TEST mode, in an automatic mode (ARMED) slaved to flow sensors at water inlet or inlets 480 connected to the payload tank, or OFF. In the TEST position, only gel concentrate pump 462 is powered. This feature is provided primarily for system checks and maintenance.

In an exemplary configuration for purposes of aircraft 400, gel select switch 26 of control system 100 can select from a group of six gel-water mix ratios: 0.25%, 0.30%, 0.37%, 0.50%, 0.65% and 1.00%, which are the U.S. Forest Service's approved mix ratios on the Qualified Products List (QPL) as of September 2017 for all liquid water enhancers authorized for use in SEATs (single-engine air tankers) and multi-engine air tankers. The control circuitry of control system 100 is configured to adjust the speed (i.e., RPM) of gel pump 462 to provide the desired mix ratio, preferably but not necessarily by means of RPM is controlled by means of pulse width modulation (PWM), or by current control, thru motor windings.

If aircraft 400 is already provided with a gel or foam reservoir (e.g., built into the aircraft's water tank 470 or carried on board), it can be used as a gel reservoir. If no reservoir exists, a gel reservoir 460 can be added to aircraft 400, in which case the added reservoir will be sized having regard to the size of water tank 470 and fuel cycle capabilities. Gel reservoir 460 will be sized to hold a gel volume sufficient for at least one fuel cycle (depending on the gel-water mix ratio selected, as well as other operational parameters). Gel resupply is then conducted during refueling.

Gel pump (or pumps) 462 may be located within or external to gel reservoir 460, and the flow of gel $F_G$ is routed via gel supply line 465 to a gel injection point 482 at or proximal to fill port 475 where the flow of water $F_w$ from water inlet 480 enters water tank 470, with water flow $F_w$ generating sufficient force to shear the gel in order to make the final product (i.e., gel-water emulsion).

Gel display panel/totalizer 10 of control system 100 provides a user interface with a screen 15 that displays the recorded amount of gel delivered, and the total volume (in liters or gallons) of payload (i.e., gel-water emulsion) delivered to water tank 470, based on the selected mix ratio. The totalizer's signal source (not the power source) for emulsion volume delivered is from the same indicator that provides a cockpit gage readout of payload volume (liters or gallons) and/or payload weight (converted to liters or gallons) and/or flow meters and/or water tank probes.

If the gel concentrate in gel reservoir 460 is depleted while gel injector pump 462 is operating, the flow sensor 64 and GPU 30 of control system 100 will detect the loss in pressure, and will interrupt electrical power to gel display panel/totalizer 10. Therefore, totalizer 10 can only operate when all three of the following conditions are met simultaneously, for greater assurance of a verifiable volume of gel-water payload deliverable to a fire agency:

Water flow is detected entering payload tank 470;

Gel pump 462 is operating; and

Gel pump 462 has positive output pressure.

Gel supply conduit 465 has a one-way check valve (not shown) located just prior to (i.e., upstream of) gel injection point 482; this check valve will close immediately with a loss in pressure in gel supply line 465, due to the gel injector pump power being cut off when the water flow is shut off.

When the pilot of aircraft 400 activates the intake of water via water inlet(s) 480, the gel processing unit (GPU) 30 activates the system. GPU 30 sends gel delivery and gel blend quantity data to gel display panel 10, and sends a speed command to the pump control module (PCM) 40 (via communication link 34 in FIG. 1) based upon the gel-water blend percentage. PCM 40 controls the speed of gel pump 462 (via communication link 42 in FIG. 1) as required to blend the gel at the percentage specified on gel control panel 20. In-line flow meters (not shown) send information back to GPU 30, constantly updating gel dosing information to ensure gel-water mix ratios precisely matching the specified percentages. Gel mixing (blending) occurs prior to the water entering the payload tank. The mixed product (i.e., gel-water emulsion) is stable and homogeneous, and no recirculation of the mixed product is necessary in order to keep the product in its emulsified state.

It will be readily appreciated by those skilled in the art that various modifications to embodiments in accordance with the present disclosure may be devised without departing from the scope of the present teachings, including modifications which may use equivalent structures or materials hereafter conceived or developed. It is to be especially understood that the scope of the present disclosure is not intended to be limited to described or illustrated embodiments, and that the substitution of a variant of a claimed or illustrated element or feature, without any substantial resultant change in functionality, will not constitute a departure from the scope of the disclosure.

In this patent document, any form of the word "comprise" is to be understood in its non-limiting sense to mean that any item following such word is included, but items not specifically mentioned are not excluded. A reference to an element by the indefinite article "a" does not exclude the possibility that more than one of the element is present, unless the context clearly requires that there be one and only one such element. Any use of any form of the terms "connect", "attach", "mount", or any other term describing an interaction between elements is not meant to limit the interaction to direct interaction between the subject elements, and may also include indirect interaction between the elements such as through secondary or intermediary structure.

What is claimed is:

1. A gel-water mixing system, said mixing system comprising:
   (a) a payload tank, being of a large volumetric capacity suitable for storage of a quantity of gel-water emulsion sufficient for wildfire firefighting purposes, said payload tank having a payload tank fill port through which a flow of water from a water intake can flow into the payload tank;
   (b) a gel reservoir;
   (c) a gel pump for conveying gel via a gel supply line from the gel reservoir to an injection point associated with the water intake and proximal to the payload tank fill port;
   (d) a gel processing unit (GPU);
   (e) a gel flow sensor associated with the gel supply line, for collecting gel flow data at a selected point downstream of the gel pump, said gel flow sensor being in electronic communication with the GPU;
   (f) a water flow sensor associated with the water intake, for collecting water flow data at a selected point upstream of the gel injection point, said water flow sensor being in electronic communication with the GPU;
   (g) a gel control panel (GCP) in electronic communication with the GPU, said GCP having a gel control switch for selecting an operational mode setting;
   (h) a gel select switch associated with the GCP, for setting a desired gel-water mix ratio and for conveying gel-water mix ratio settings to the GPU; and
   (i) a pump control module (PCM) in electronic communication with the gel pump;
   such that the GPU, in response to data from the water flow sensor indicating the commencement of water flow, will send a pump speed command to the PCM, which in turn will activate the gel pump so as to initiate a flow of gel to the injection point at a rate that will produce a gel-water mixture flowing through the payload tank fill port into the payload tank with a gel-water mix ratio corresponding to a gel-water mix ratio setting received from the gel control switch;
   whereby said quantity of gel-water emulsion in said payload tank can be applied onto said wildfire.

2. A gel-water mixing system as in claim 1 wherein the GPU is configured to receive a continuous transfer of gel flow data from the gel flow sensor and water flow data from the water flow sensor, and to automatically adjust the pump speed command as necessary to maintain the selected gel-water mix ratio in response to variations in the gel flow data and water flow data.

3. A gel-water mixing system as in claim 1 wherein the gel select switch is incorporated into the GCP.

4. A gel-water mixing system as in claim 1 wherein the PCM is incorporated into the GPU.

5. A gel-water mixing system as in claim 1 wherein the PCM controls the gel pump using pulse width modulation.

6. A gel-water mixing system as in claim 1, further comprising a tank level probe for measuring the fluid level in the payload tank.

7. A gel-water mixing system as in claim 6 wherein the tank level probe is in electronic communication with the GPU.

8. A gel-water mixing system as in claim 7 wherein the GPU is configured to determine the quantity of gel-water mixture contained in the payload tank, based on data received from the tank level probe.

9. A gel-water mixing system as in claim 1, further comprising a gel display panel in electronic communication with the GPU, for receiving, recording, and displaying data from the GPU.

10. A gel-water mixing system as in claim 1 wherein the gel-water mixing system is installed in an aircraft, whereby said quantity of gel-water emulsion in said payload tank can be dropped onto said wildfire via said aircraft.

11. A gel-water mixing system as in claim 10 wherein the aircraft is selected from the group consisting of rotary-wing aircraft, scooping fixed-wing aircraft, and non-scooping fixed-wing aircraft.

12. A gel-water mixing system as in claim 10 wherein the GPU is in electronic communication with a flight control stick of the aircraft.

13. A gel-water mixing system as in claim 12 wherein the flight control stick has a trigger for initiating a flow of water in the water intake.

14. A gel-water mixing system as in claim 10 wherein the aircraft is a rotary-wing aircraft, and wherein the water intake comprises a snorkel apparatus mounted to the aircraft.

15. A gel-water mixing system as in claim 10 wherein the aircraft is a scooping, float-equipped, fixed-wing aircraft, and wherein the gel reservoir is disposed within a float of the aircraft.

16. A gel-water mixing system as in claim 10 wherein the aircraft is a scooping, float-equipped, fixed-wing aircraft, and wherein the gel pump is disposed within a float of the aircraft.

* * * * *